Aug. 15, 1944.    S. FRISHETTE    2,355,965
REAMER
Filed July 21, 1943
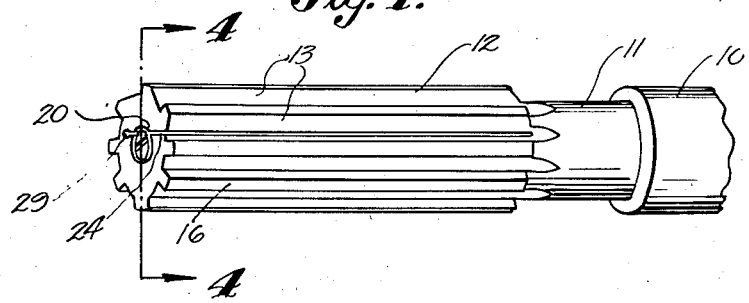
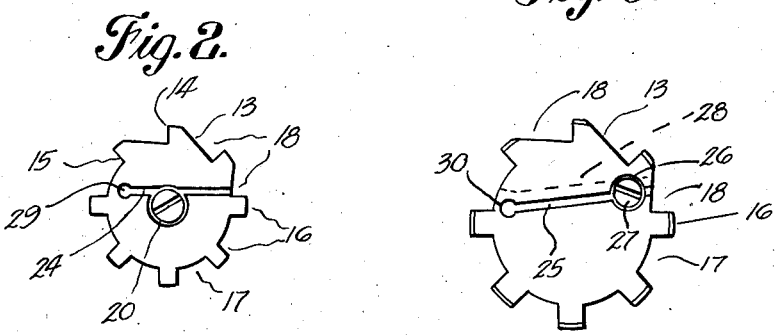
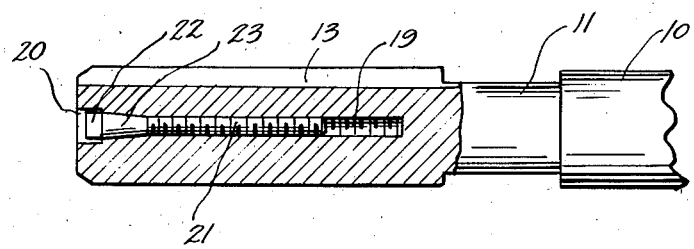
INVENTOR.
STANTON FRISHETTE
BY
Louis Chayka
ATTORNEY Patented Aug. 15, 1944

2,355,965

UNITED STATES PATENT OFFICE 2,355,965

REAMER

Stanton Frishette, Detroit, Mich.

Application July 21, 1943, Serial No. 495,794

3 Claims. (Cl. 77—75)

The purpose of my invention is to provide a reamer which will cut metal or other material evenly to a desired depth which will eliminate what is known as chatter, and which will produce a uniformly smooth surface.

It is a known fact that individual teeth of a reamer may be more or less efficient than other teeth in the same tool, this inequality in their cutting capacity being responsible for rough finish of the reamed surface or uneven diameter of the hole reamed.

Another undesirable feature of the conventional reamer is the fact that it develops the above mentioned chatter. This is an indication of a jerky cutting action of the reamer, resulting in rough and uneven surfaces. Although some measures have been taken to overcome this defect, like, for instance, the employment of an odd number of flutes or a helical fluting, the results have not always been satisfactory.

Having the above facts in mind, I have improved the conventional reamer by a radical change in its design, that is by materially reducing the number of its cutting teeth and by placing them only on one side with respect to its diameter. Preferably the teeth disposed along the circumference of the reamer are restricted to an arc of 60 to 120 degrees. In place of teeth which are normally spaced around the circumference of the reamer, I have substituted mere guiding projections disposed longitudinally on the body of the reamer.

As the cutting elements of my reamer have been thus limited in number and yet all the cutting has to be done by this limited number of teeth, I prefer to have them made of steel especially suitable for the purpose and to have them brazed or otherwise secured to the body of the reamer. This is especially desirable in view of the fact that I am also employing means for radially raising the teeth to compensate for the wear of their cutting edges.

I shall now describe my reamer with reference to the accompanying drawing in which Fig. 1 is a perspective view of a reamer incorporating my improvements;

Fig. 2 is the end view of one species of my improved reamer;

Fig. 3 is the end view of another species of my improved reamer;

Fig. 4 is a longitudinal sectional view of my reamer shown in Fig. 1, taken on line 4—4 in said figure.

Similar numerals refer to similar parts throughout the several views.

The reamer shown by me, comprises a shank 10, a body 12, and a neck 11, between the two, being of smaller diameter than either of them. The body, substantially cylindrical in form, contains a number of teeth 13, having cutting edges or lips 14 at the top of faces 15, said teeth being conventional in form. However, as will be observed with reference to the drawing, the reamer shown by me has only three teeth as against six to eight, which is the number ordinarily used in reamers. I wish to point out in this connection that the number of teeth shown in my drawing is not critical and that it may be increased or decreased, although results obtained with a three tooth reamer are fully satisfactory. Irrespective of their number, the teeth are all disposed in a group, one following the other with a conventional spacing between them, and all are disposed on one side of the diameter of the reamer.

Guiding projections 16, already mentioned herein, are devoid of any cutting edges, and are designed to be only in a sliding contact with the surface exposed to the cutting action of the reamer's teeth. They are separated from each other by flutes 17, similar to flutes 18 separating teeth 13.

Axially located within reamers shown in Figs. 1, 2, and 4, is a threaded hole 19, having a mouth 20 in the operative end of the reamer said mouth being of a somewhat larger diameter than the rest of the hole. The body of the reamer, or what is specifically known as the web, being that part of the reamer which is contained between its flutes, is cut by a transverse slot 24, beginning with a circular aperture 29. The slot passes through said hole 19, running into it at its outer circumference, and extends longitudinally close to where the body joins neck 11. The length of the slot is only suggestive and may be varied if desired. Operatively disposed within hole 19 is an elongated screw 21, having a head 22 of a larger diameter than that of the rest of it, and including a tapering portion 23. The purpose of the taper is quite obvious. As screw 21 is turned in, the taper causes the part of the reamer above slot 24 to expand outwardly. The cutting edges of the teeth, worn out by use, may be thus brought into a more efficient operative contact with the surface to be reamed.

A different arrangement of the slot is shown in Fig. 3. The slot 25 is disposed in the web of the reamer to one side of its axis, running from a circular aperture 30 to the surface of the reamer behind its last cutting tooth. A circular hole 26, analogous to hole 19 in Fig. 4, extends parallel to the axis of the reamer while a screw 27 within the hole, is made in the same form and serves the same purpose as screw 21 in Fig. 4.

As already indicated, the body of the reamer may be made of one sort of steel and the teeth of another. What is needed for the body of the reamer is steel which has some resiliency and which may be flexed sufficiently for the outward expansion of that part of the web of the reamer which supports its teeth, said expansion to be accomplished by means of the slot and screw arrangement described above. The teeth made for cutting, may be brazed or otherwise secured to the web of the reamer along the dotted line 28 as shown in Fig. 3.

It will be seen that some changes may be made in the shape of my reamer and the arrangement of its parts without departing from the inventive principle herein disclosed by me. What I, therefore, wish to claim, is the following:

1. A reamer having a circular body, a plurality of consecutive teeth along a part of its periphery, a plurality of sliding guides in place of teeth along the rest of said periphery, a longitudinal slot in the body of the reamer and disposed transversely under said teeth, and screw means to expand outwardly the teeth supporting part of the reamer separated from the main part of the body by said slot.

2. A reamer having a circular body, a plurality of teeth along its circumference but only on one side of its diameter, a plurality of sliding guides in place of teeth along the rest of said circumference, a transverse slot separating the teeth bearing portion of the body from its main portion, a threaded hole in said main portion of the body, extending in the direction of the longitudinal axis of said body, said slot intersecting said hole, and a tapered screw in said hole, the side of the screw, along its length, bearing against the teeth supporting portion of said body of the reamer, the largest diameter of the screw being somewhat larger than the diameter of the hole.

3. A reamer including a shank and a cylindrical solid body having a plurality of cutting teeth along a part of its periphery, a plurality of sliding guides in place of teeth along the rest of said periphery, a threaded hole in said body, extending in the direction of its axis, a transverse slot in the body, substantially coextensive with the length of the hole but intersecting the same to divide the teeth-bearing portion of the body from the guide-bearing portion thereof, and a tapered screw fitting into said hole, and bearing along its length aganist said teeth-bearing portion of the body, a part of said tapered screw having a diameter larger than the diameter of the hole.

STANTON FRISHETTE.